No. 892,368. PATENTED JUNE 30, 1908.
G. DAVIS.
ANIMAL TRAP.
APPLICATION FILED MAR. 25, 1908.
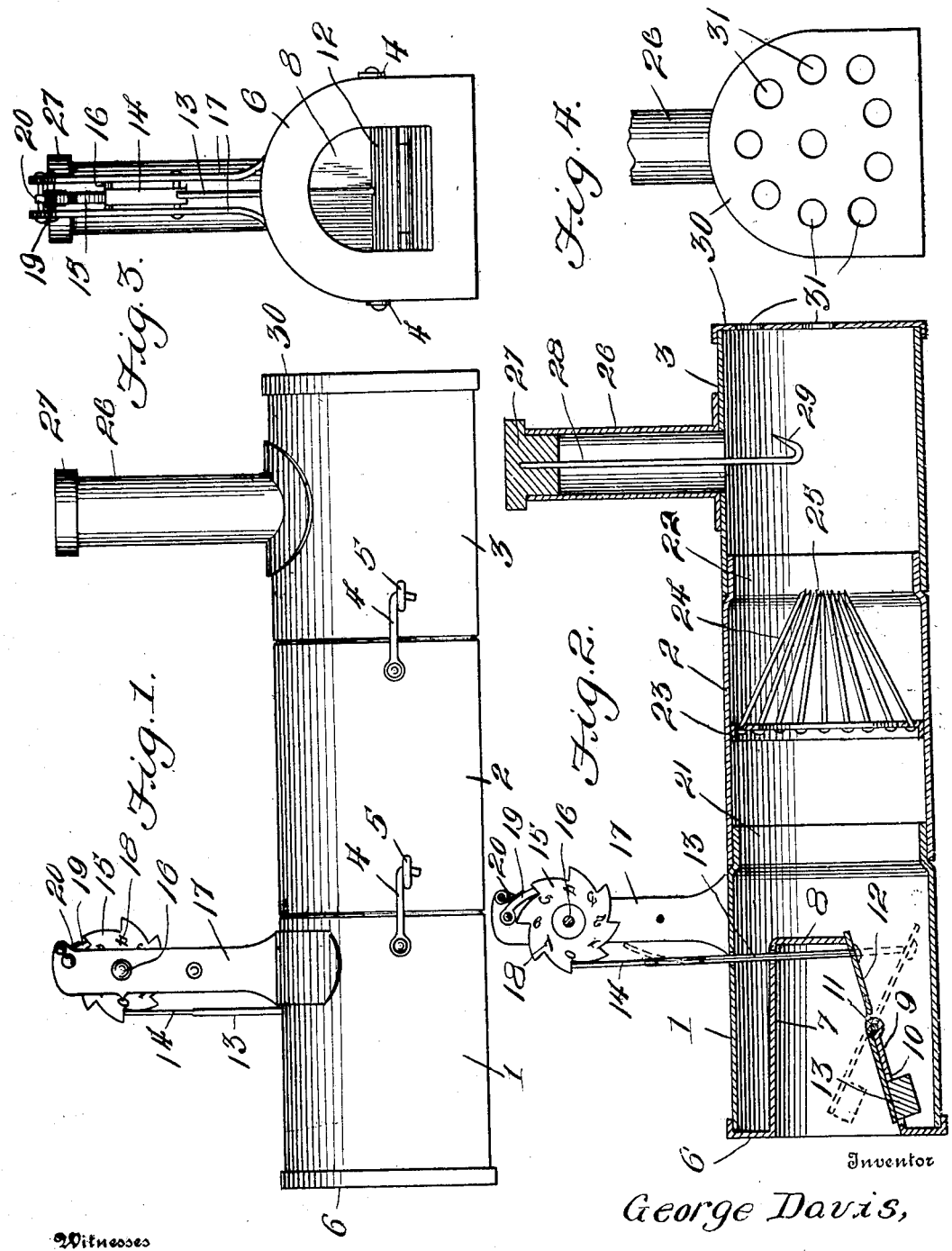
Inventor
George Davis,
By Victor J. Evans,
Attorney
Witnesses

UNITED STATES PATENT OFFICE.

GEORGE DAVIS, OF BESSEMER, ALABAMA.

ANIMAL-TRAP.

No. 892,368.   Specification of Letters Patent.   Patented June 30, 1908.

Application filed March 25, 1908. Serial No. 423,247.

*To all whom it may concern:*

Be it known that I, GEORGE DAVIS, a citizen of the United States of America, residing at Bessemer, in the county of Jefferson and State of Alabama, have invented new and useful Improvements in Animal-Traps, of which the following is a specification.

This invention relates to animal traps, and one of the principal objects of the same is to provide an animal trap to be made in sections which shall be detachable so that the trapped animal may be removed from the operative parts of the trap.

Another object of the invention is to provide means for setting the trap after an animal has passed into the trap and for registering the number of animals caught.

These and other objects may be attained by means of the construction illustrated in the accompanying drawing, in which,—

Figure 1 is a side elevation of an animal trap made in accordance with my invention. Fig. 2 is a longitudinal section through the same. Fig. 3 is a front end view of my trap. Fig. 4 is a rear end elevation of the same.

Referring to the drawing for a more specific description of my invention, the numeral 1 designates one of the sections of the trap; 2 is another section, and 3 is the third section thereof. These three sections are connected together by means of hooks or latches 4 and eyes 5, one upon each side of each section.

The section 1 of the trap comprises a hollow casing having a flat bottom and a rounded top, said casing having a front portion 6 having an inwardly extending wall 7 and a downwardly extending portion 8. Extending from the lower part of the front portion 6 is a platform 9 having an aperture 10 therein, and pivoted to the end of the platform on the pin 11 is a lever 12 provided with a weight 13 at one end which extends through the aperture 10 in the platform 9. The end of the lever 12 bears against the lower edge of the downwardly extending portion 8, and carried by said lever is a rod 13 having at its upper end a spring 14 which engages the teeth of a ratchet wheel 15, said ratchet wheel being pivoted at 16 between a pair of uprights 17 connected to the top of the section 1 of the trap.

The ratchet wheel 15 is provided with indicating marks 18, one for each tooth, and as the lever 12 is depressed by an animal which passes into the trap the spring 14 is carried down under another tooth of the ratchet wheel 15, and when the spring 14 rises after the animal has passed off the lever 12 the ratchet wheel is rotated one tooth.

A pawl 19 is pivoted to the uprights 17, and a spring 20 bears upon the pawl to hold it down. The end 21 of the section 1 is reduced in size and fits into the end of section 2, and the end 22 of the section 2 is likewise reduced and fits into the end of the section 3. The section 2 is provided with a centrally disposed metal ring 23 to which a series of converging pins 24 is secured, said pins being so related and arranged as to form a restricted opening 25, through which an animal will pass to reach the bait chamber provided in section 3. Extending upward from section 3 of the trap is a pipe 26 which communicates with the interior of the section 3 and a plug 27 adapted to close the upper end of the pipe 26 has secured to it a bait hook 28, said hook extending down into the interior of section 3 where bait is placed upon the pointed end 29 to attract the animals into the trap. The end 30 of the section 3 is provided with a series of ventilating openings or perforations 31.

From the foregoing it will be obvious that an animal trap made in accordance with my invention will operate efficiently for its purpose, that the various sections may be readily removed one from the other to permit the sections containing the animal to be removed from the operative parts of the trap.

Having thus described the invention, what is claimed as new, is:—

1. An animal trap comprising three sections removably connected together, one of said sections being provided with a pivoted weighted lever, another section being provided with a series of pins arranged to converge and form a restricted passage, and a third section forming a bait chamber and provided with a pipe having a stopper carrying a bait hook extending into said chamber.

2. An animal trap comprising a series of sections detachably connected together, a weighted lever pivoted in one of the sections, a rod resting upon said lever and carrying a spring at its upper end, a ratchet wheel, said spring engaging said ratchet wheel to register the number of operations of the trap and to also indicate when an animal has passed into the trap.

In testimony whereof I affix my signature in presence of two witnesses.

GEORGE DAVIS.

Witnesses:
G. H. STEVENSON,
L. C. CROOK.